United States Patent
Oltmann

(10) Patent No.: US 11,975,804 B2
(45) Date of Patent: May 7, 2024

(54) OFFSHORE PLATFORM COMPRISING A DECK AND A DOCKING DEVICE, AND METHOD FOR TRANSFERRING PERSONNEL

(71) Applicant: Overdick GmbH & Co. KG, Hamburg (DE)

(72) Inventor: Klaas Oltmann, Seevetal (DE)

(73) Assignee: Overdick GmbH & Co. KG, Hamburg (DE)

( * ) Notice: Subject to any disclaimer, the term of this patent is extended or adjusted under 35 U.S.C. 154(b) by 867 days.

(21) Appl. No.: 16/978,809

(22) PCT Filed: Mar. 7, 2019

(86) PCT No.: PCT/EP2019/055776
§ 371 (c)(1),
(2) Date: Sep. 8, 2020

(87) PCT Pub. No.: WO2019/170833
PCT Pub. Date: Sep. 12, 2019

(65) Prior Publication Data
US 2021/0047006 A1 Feb. 18, 2021

(30) Foreign Application Priority Data
Mar. 8, 2018 (DE) ...................... 10 2018 105 328.2

(51) Int. Cl.
*B63B 27/10* (2006.01)
*B63B 27/14* (2006.01)
(Continued)

(52) U.S. Cl.
CPC .............. *B63B 27/16* (2013.01); *B63B 27/14* (2013.01); *B63B 27/30* (2013.01); *B63B 35/44* (2013.01)

(58) Field of Classification Search
CPC ......... B63B 27/14; B63B 27/16; B63B 27/30; B63B 35/44
(Continued)

(56) References Cited

U.S. PATENT DOCUMENTS 3,373,713 A 3/1968 Hindman et al.
4,003,473 A * 1/1977 Ryan ..................... E02B 3/24
114/230.14

(Continued)

FOREIGN PATENT DOCUMENTS

DE 20211145 U1 10/2002
ES 2380034 A1 5/2012
(Continued)

OTHER PUBLICATIONS

International Search Report, European Patent Office, dated May 14, 2019.
(Continued)

*Primary Examiner* — Raymond W Addie
(74) *Attorney, Agent, or Firm* — Bay State IP, LLC

(57) ABSTRACT

An offshore platform device comprising a platform and a docking device which has a vertically oriented longitudinal axis (L) and is designed to be raised along its longitudinal axis (L) relative to the platform (3) into a transport position and to be lowered into an operational position, the docking device (4) having at its lower end at least one docking point (8a, 8b, 8c, 8d) which is accessible from a boat (11) in the operational position.

11 Claims, 5 Drawing Sheets

Figure 1:
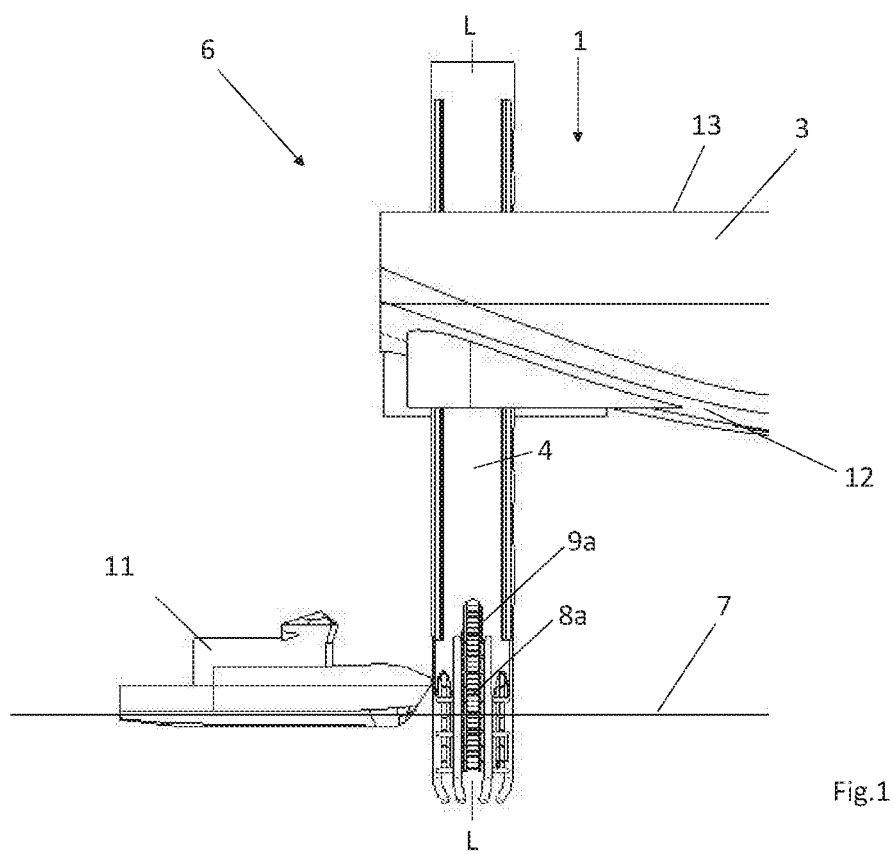

(51) Int. Cl.
  *B63B 27/16* (2006.01)
  *B63B 27/30* (2006.01)
  *B63B 35/44* (2006.01)

(58) Field of Classification Search
  USPC .................................. 14/71.3; 114/48, 362
  See application file for complete search history.

(56) References Cited

U.S. PATENT DOCUMENTS

| | | | | |
|---|---|---|---|---|
| 4,166,517 | A | * | 9/1979 | Henderson ............ B63B 27/146 187/401 |
| 4,739,721 | A | * | 4/1988 | Peyre ...................... B63B 27/36 114/348 |
| 4,817,552 | A | | 4/1989 | Poldervaart |
| 8,407,840 | B2 | * | 4/2013 | Fleischer .............. B66F 11/044 14/71.3 |
| 8,745,801 | B2 | * | 6/2014 | Prins ...................... E01D 15/10 14/72.5 |
| 9,758,941 | B2 | * | 9/2017 | Finn, III ................ E02B 17/027 |
| 2009/0100641 | A1 | * | 4/2009 | Yang ................... E05D 11/1078 16/303 |
| 2015/0375831 | A1 | | 12/2015 | Taylor |
| 2016/0068373 | A1 | * | 3/2016 | Chin ....................... B66B 9/187 212/253 |

FOREIGN PATENT DOCUMENTS

| | | |
|---|---|---|
| GB | 2483630 A | 3/2012 |
| GB | 2485868 A | 5/2012 |
| JP | S6283295 A | 4/1987 |
| WO | 2010034429 A2 | 4/2010 |
| WO | 2011019289 A1 | 2/2011 |

OTHER PUBLICATIONS

Written Opinion International Searching Authority, European Patent Office, dated May 14, 2019.

* cited by examiner

OFFSHORE PLATFORM COMPRISING A DECK AND A DOCKING DEVICE, AND METHOD FOR TRANSFERRING PERSONNEL

CROSS REFERENCE TO RELATED APPLICATION

This application is for entry into the U.S. National Phase under § 371 for International Application No. PCT/EP2019/055776 having an international filing date of Mar. 7, 2019, and from which priority is claimed under all applicable sections of Title 35 of the United States Code including, but not limited to, Sections 120, 363, and 365(c), and which in turn claims priority under 35 USC 119 to German Patent Application No. 10 2018 105 328.2 filed on Mar. 8, 2018.

The invention relates to an offshore platform comprising a platform and a docking device. The invention also relates to a method for transferring personnel to and from an offshore platform.

Naturally, offshore platforms are well known in the prior art.

Offshore platforms have a platform with a top side, also referred to as a deck. In the case of so-called "jack-up platforms" the platform itself is floatable, and supporting legs are passed through the platform.

In the raised state the jack-up platform is brought by sea to the location, and there the supporting legs are lowered. After the supporting legs have contact with the bottom and are standing firmly there, the platform is lifted out of the sea by means of a jacking system or the like and is fixed on the supporting legs at an operational height. The distance between sea level and the underside of the platform can be considerable. It is preferably chosen so that the waves break below the platform, so that the least possible load acts against the offshore platform.

One problem is the transfer of personnel to and from the platform by means of so-called "crew transfer vessels", that is to say supply vessels. For this purpose ladders are possibly provided along the supporting legs. The personnel can also be brought to and from the platform by means of a suitable crane-based transfer system with a personnel cage, a so-called "frog" or "Billy Pugh". These devices are relatively uncomfortable for the personnel and, furthermore, also presuppose a further crane operator. Naturally that is expensive and time-consuming.

A first object of the invention is to provide an offshore platform which avoids or at least reduces the above-mentioned disadvantages.

A second object of the invention is to provide a method for transferring personnel which reduces the said disadvantages.

In the first aspect this object is achieved by an offshore platform device referred to in the introduction and having the features of claim 1.

The offshore platform according to the invention has a platform which preferably comprises the deck and superstructures on the deck, as well as a docking device, which is elongated and has a longitudinal axis which is oriented vertically. The docking device is movable to and fro along its longitudinal axis relative to the platform, in particular it can be raised into a transport position and lowered into at least one operational position. On the lower end, i.e. the end facing the seabed, the docking device has at least one docking point. The at least one docking point is provided for docking of a boat, in particular a crew transfer vessel (CTV).

The docking device itself can be tubular along its outer circumference; however, it can also be square or rectangular in cross-section or can have other shapes. It has a hollow interior and accessible by personnel.

The docking device preferably has an interior space which is accessible and which produces an accessible connection between the at least one docking point and an exit. The docking device has the function of a staircase or lift shaft and is preferably comparably dimensioned.

However, it is preferably tubular in design, i.e. in cross-section it has a substantially circular external shape preferably along its entire longitudinal axis, which simplifies a rotary movement of the docking device relative to the platform.

The at least one docking point is preferably designed to be rotatable about the longitudinal axis. The preferably precisely one rotatable docking point is preferably provided at the lower end of a docking device which is rotatable about the longitudinal axis. In this case the docking device itself can be designed, for example, as a double tube, wherein the inner tube is arranged rotatably in the outer tube and the outer tube is arranged on the platform so as to be movable to and fro in the direction of the longitudinal axis relative to the platform. As a result the docking of the boat can always take place precisely against the prevailing swell take place, in order to prevent excessive rolling movements of the boat and to make the transfer safer.

In particular, the docking device can have on its outer wall toothed racks which are preferably T-shaped in cross-section and co-operate in each case with two gears which are arranged adjacent to one another and are provided rotatably on an inner side of an opening in the platform.

The docking device is preferably formed by an advantageously cylindrical tube which is passed through the platform, in particular through a passage. It is movable to and fro in this opening, i.e. it can be raised upwards and can be lowered downwards.

At the lower end of the docking device a plurality of docking points are advantageously arranged circumferentially around the longitudinal axis. In this embodiment the docking device itself does not need to be designed to be rotatable about the longitudinal axis; it is sufficient if it is movable along the longitudinal axis. Each of the docking points is intended and designed for docking of a CTV. Each of the docking points comprises a ladder. In addition to the ladder, in each case a guard is arranged on both sides and radially externally. The guard can be designed as a steel tube which is preferably angled radially inwards on the seabed side. The device is lowered in each case so far that the boat is prevented from passing underneath in the wave trough.

The docking device comprises an interior space through which the ladders of the docking points are led from the respective docking point to the exit arranged at the upper end. A plurality of exits arranged one above the other can preferably be provided on the upper portion and lead into the middle portion of the docking device. The docking device can be fixed in various operational positions on the platform. The operational positions are determined according to the height of the sea level and the sea depth. Depending upon the operational position, a portion of the docking device of differing length projects below the platform, and in each case the length of this portion is chosen such that a lower end of the docking device touches the surface of the sea or is immersed in the sea to some extent.

In the second aspect, the object is achieved by a method with the features of claim 8.

According to the invention the method is characterised in that a docking device is lowered relative to a platform along a longitudinal axis which is oriented vertically, until a lower end of the docking device, which has at least one docking point, is accessible from a boat, and preferably touches the sea.

According to the method the offshore platform device is first of all brought to the location with the supporting legs retracted and also with the docking device raised. The docking device is raised to such an extent that its lower end also does not increase the draught of the offshore platform device. A lower end of the docking device preferably does not project beyond an underwater surface of the platform.

At the location first of all the supporting legs are then lowered until they stand firmly on the seabed. The platform is raised out of the sea by means of a jacking system or the like until it has reached an operational position. In the operational position of the platform the docking device leaves the transport position, and also the docking device is transferred into its operational position. The operational position of the docking device is characterised in that a docking point at the lower end of the docking device is accessible from a boat, and is preferably immersed in the sea, or is arranged just above the sea level, so that ladders arranged on the docking device can be conveniently accessed from the boat.

A penetration depth of the docking device into the water can be adjusted to a water level which varies with the tide. Thus the docking device has various operational positions which are determined by the distance between the surface of the sea and the underside of the platform. The distance depends upon the tides, but also upon the location of the platform. The docking device can be fixed on the platform in different operational positions. The operational positions differ by the length of a portion of the docking device projecting below the platform.

Figure 2:
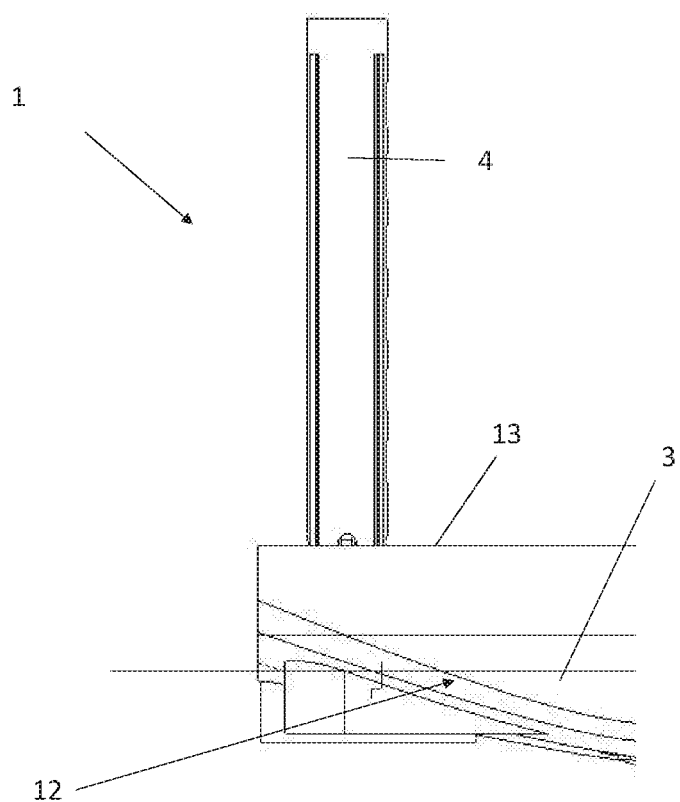
Figure 3:
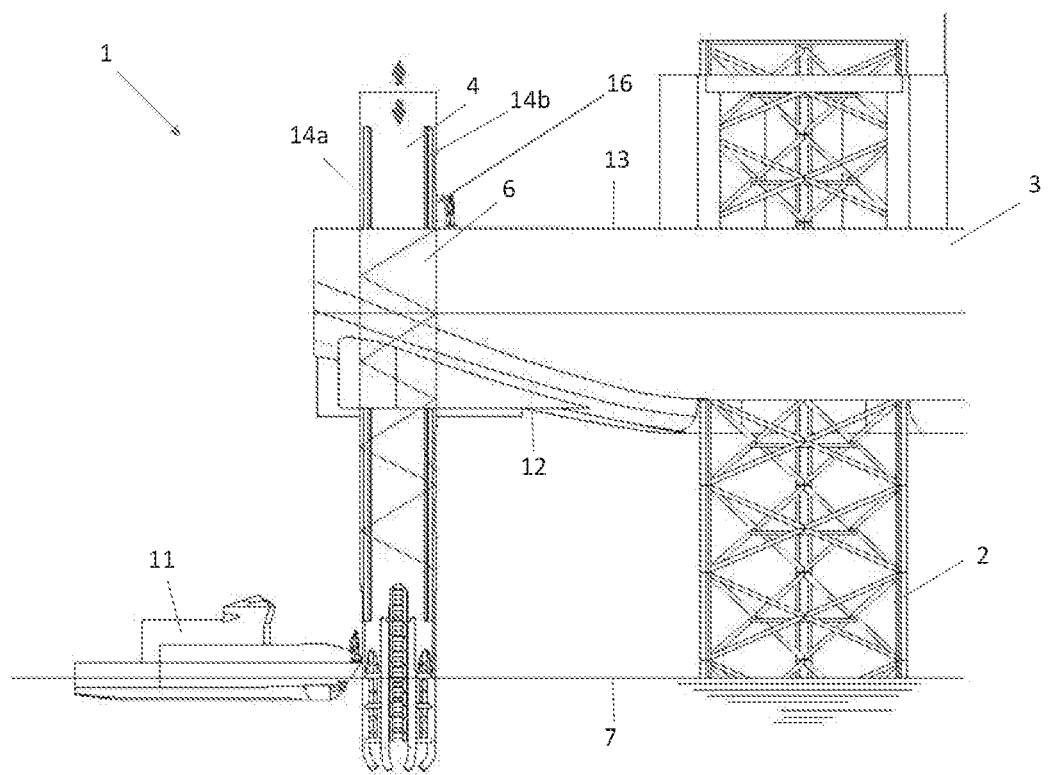
Figure 4A:
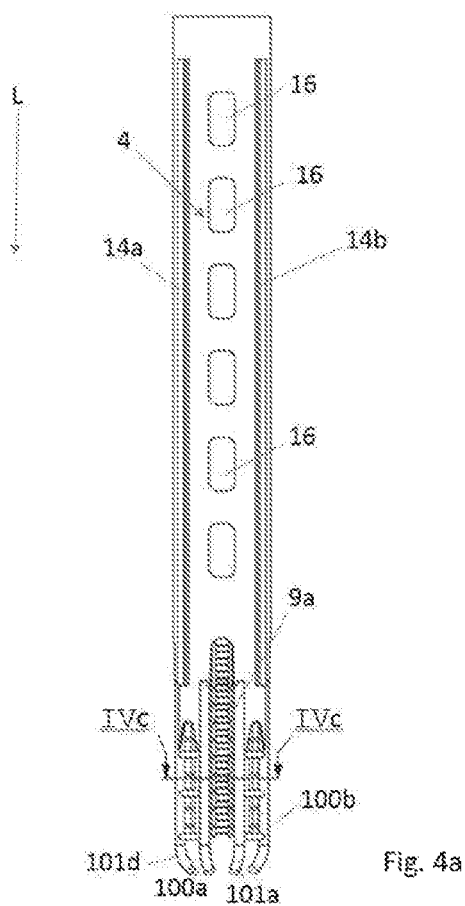
Figure 4B:
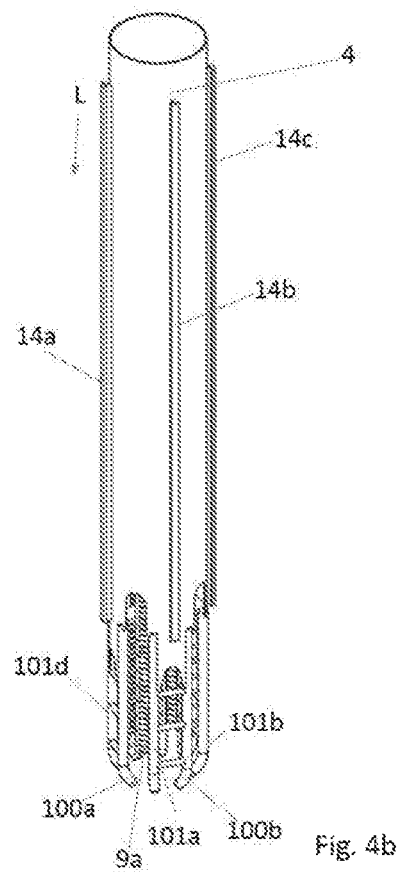
Figure 4C:
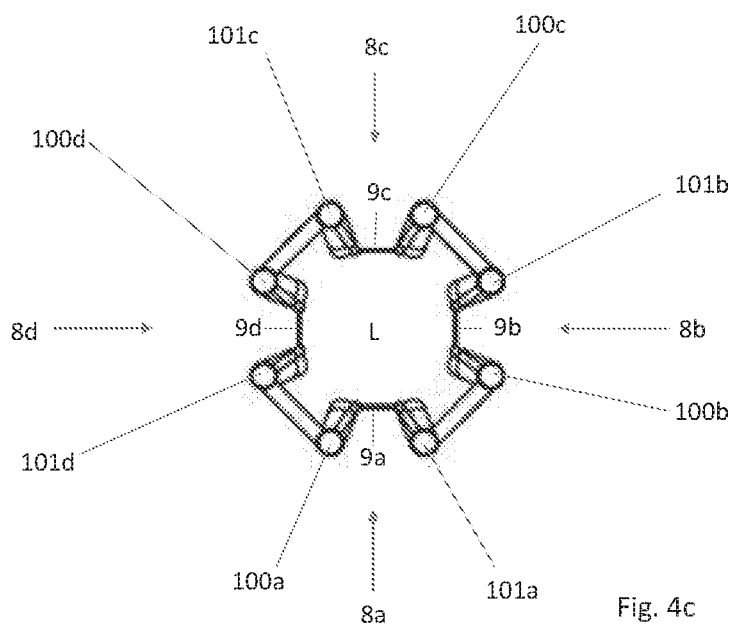

The invention is described with reference to an embodiment in six drawings. In the drawings:

FIG. 1 shows a side view of an offshore platform device, supported on supporting legs, with a lowered docking device and a boat, FIG. 2 shows a floating offshore platform device with raised docking device and raised supporting legs, FIG. 3 shows a side view of a part of the offshore platform device with a supporting leg positioned and a docking device lowered and a boat docked to the docking device, FIG. 4a shows a side view of the docking device with a plurality of exits, FIG. 4b shows an isometric view of the docking device in FIG. 4a, FIG. 4c shows a cross-sectional view along the line IVc-IVc in FIG. 4a.

FIG. 1 shows a part of an offshore platform device 1 which has a plurality, preferably three, four or a higher number, of supporting legs 2 which are lowered on the seabed and support the offshore platform device 1 there. The supporting legs 2 are shown in FIG. 3. A platform 3 is lifted out of the sea raised into an operational position by means of, for example, a jacking system. In the operational position of the platform 3 a docking device 4 according to the invention is put into operation. The docking device 4 is passed completely through a passage 6 in the platform 3. The docking device 4 is a tubular structure with a completely straight longitudinal axis L which is oriented vertically. The docking device 4 can be raised and lowered along its longitudinal axis L, that is to say perpendicular to the surface of the sea 7. When the platform 3 is in the operational position according to FIG. 1 or FIG. 3, the docking device 4 is lowered until a lower end of the docking device 4 facing the seabed touches the surface of the sea 7 and preferably is immersed some way into the water. Then the docking device 4 is fixed on the platform 3, for example by transverse bolts or the like, and first of all is held permanently in its operational position relative to platform 3. As the water level changes with the tides the position of the docking device 4 can be adjusted relative to the platform 3 in such a way that the docking device 4 is raised as the water level rises and is lowered as the water level drops and an approximately constant lower portion of the docking device 4 remains immersed in the water.

In FIG. 1 four docking points 8a, 8b, 8c, 8d are arranged at the lower end of the docking device 4. Only the frontmost docking point 8a can be seen. FIG. 4c shows the uniform distribution of the docking points 8a, 8b, 8c, 8d around the docking device 4. Each of the docking points 8a, 8b, 8c, 8d has a centrally arranged ladder 9a, 9b, 9c, 9d, onto which the personnel can transfer directly from a boat 11, or from the ladder 9a, 9b, 9c, 9d the personnel can transfer directly onto the bow of the boat 11. Guards 100a, 101a, 100b, 101b, 100c, 101c, 100d and 101d are provided on each of the two sides of each ladder 9a, 9b, 9c, 9d. These guards are steel tubes which are oriented along the longitudinal axis L and are spaced apart in such a way that the boats 11 which are used, in particular crew transfer vessels (CTVs), move with their bow between two adjacent guard bars and in this case touch both the guard bars, and a bow tip nevertheless remains spaced apart some way from the ladders 9a, 9b, 9c, 9d. The bow of the CTV advantageously has fenders or a rubber coating. With the propulsion of the CTV switched on, due to the pressure of the bow against the guard 100a, 101a, 100b, 101b, 100c, 101c, 100d, 101d a frictional connection is produced between the bow of the CTV and the guard 100a, 101a, 100b, 101b, 100c, 101c, 100d, 101d, so that the bow maintains its position relative to the ladder 9a, 9b, 9c, 9d in spite of the swell and a safe transfer of the personnel from a deck 13 of the boat 11 onto the ladder 9a, 9b, 9c, 9d or vice versa is possible.

FIG. 2 shows the offshore platform device 1 of FIG. 1 in a transport position. The supporting legs 2 (not shown) are retracted, and the platform 3 floats in the sea. In the transport position the docking device 4 is completely raised and is itself located in a transport position. In the transport position the lower end of the docking device 4 does not project beyond an underwater surface 12 of the platform 3 in the direction of the seabed.

FIG. 3 shows the operational position of the offshore platform device 1 in greater detail. The platform 3 has a top side and an underside. The top side is also designated as the deck 13. The underside is also part of the underwater surface 12. The circular passage 6 through which the tubular docking device 4 is inserted is guided vertically and continuously into the platform 3. The docking device 4 has on its outside four toothed racks 14a, 14b, 14c which are spaced apart equidistantly from one another and arranged along the longitudinal axis L and which on the inside of the cylindrical passage 6 the platform 3 are driven by gears which engage in the toothed racks 14a, 14b, 14c, so that a lowering movement and a lifting movement are made possible.

In the upper portion of the docking device 4 exits 16 are provided in the outer wall. The four docking points 8a, 8b, 8c, 8d are formed at the lower end. The docking points 8a, 8b, 8c, 8d run completely around the cross-section of the docking device 4, so that docking is possible from four directions by means of the CTV. For this purpose the lower end of the docking device 4 is sufficiently far away from the lowered supporting leg 2 according to FIG. 3, i.e. the distance is at least one CTV length, but advantageously significantly more.

In the interior of the tubular docking device 4 a ladder, staircase or the like is provided, and a lift can also be provided, which enables the transport of personnel from the deck 13 to the docking point 8a, 8b, 8c, 8d and back. Each of the docking points 8a, 8b, 8c, 8d themselves is likewise designed as an opening in the outer wall, through which the ladder 9a, 9b, 9c, 9d is accessible.

FIG. 4a shows the actual docking device 4 in a side view. With regard to the longitudinal axis L in the upper portion and in the middle portion the exits 16 are arranged one above the other and spaced apart from one another in the outer wall. The docking device 4 can assume various operational positions. The docking device 4 can be locked at different heights relative to the platform 3. At each of the different heights a different one of the exits 16 is arranged level with the deck 13 of the platform 3. The docking device 4 is lowered in the direction of the seabed until the lower portion of the docking device 4 is immersed in the water. Since the distance between the surface of the sea 7 and the underside 12 of the platform 3 will change in the course of the day, for example due to the tidal range, the docking device 4 can be moved progressively, wherein the different exits 16 are arranged at the level of the deck 13. The operational position of the docking device 4 can also change when the erection location of the platform 3 changes.

The four toothed racks 14a, 14b, 14c are arranged on the outer wall of the docking device 4. The toothed racks 14a, 14b, 14c are each designed with a T-shaped cross-section. The actual tooth profile is arranged perpendicular to the outer wall on both sides of the T legs of the T profile. For each T profile at least two gears are provided, the axis of rotation of which runs radially relative to the circular cross-section of the docking device 4.

The ladder 9a, 9b, 9c, 9d leading up from each docking point 8a, 8b, 8c, 8d preferably leads to an intermediate platform, which is not illustrated, from which in turn an individual ladder or staircase (not illustrated) leads up, passing each of the exits 16.

FIG. 4c shows a section along the line IVc-IVc in FIG. 4a. Four docking points 8a, 8b, 8c, 8d with four ladders 9a, 9b, 9c, 9d are provided, in each case with two steel tubes as guards which support the bow of the CTV and prevent the bow of the CTV from touching the associated ladder 9a, 9b, 9c, 9d. In a rotatably arranged version of this invention one docking point is sufficient.

In FIG. 4b the view of FIG. 4a is illustrated in an isometric view. The circular tube cross-section is clearly visible, as is the T-shaped configuration of the lateral toothed racks 14a, 14b, 14c. The guard 100a, 101a, 100b, 101b, 100c, 101c, 100d, 101d is in each case bent inwards on the seabed side.

LIST OF REFERENCES 1 offshore platform device
2 supporting legs
3 platform
4 docking device
6 passage
7 surface of the sea
8a docking point
8b docking point
8c docking point
8d docking point
9a ladder
9b ladder
9c ladder
9d ladder
11 boat (CTV)
12 underwater surface/underside
13 deck/top side
14a toothed rack
14b toothed rack
14c toothed rack
16 exits
100a guard
101a guard
100b guard
101b guard
100c guard
101c guard
100d guard
101d guard
L longitudinal axis

What is claimed is:

1. Offshore platform device comprising:
a platform and a docking device which has a vertically oriented longitudinal axis (L) and is designed to be raised along its longitudinal axis (L) relative to the platform (3) into a transport position and to be lowered into an operational position;
the docking device (4) having at its lower end at least one docking point (8a, 8b, 8c, 8d) which is accessible from a boat (11) in the operational position;
characterized in that the docking device (4) is guided through a passage (6) in the platform (3) and can be raised upwards and lowered downwards in the passage (6).

2. Offshore platform device according to claim 1, characterised in that in the operational position the at least one docking point (8a, 8b, 8c, 8d) touches the sea.

3. Offshore platform device according to claim 1, characterised in that the at least one docking point (8a, 8b, 8c, 8d) is designed to be rotatable about the longitudinal axis (L).

4. Offshore platform device according to claim 1, characterised in that at the lower end of the docking device (4) a plurality of docking points (8a, 8b, 8c, 8d) are arranged circumferentially around the longitudinal axis (L).

5. Offshore platform device according to claim 1, characterised in that the docking device (4) comprises an interior space through which at least one ladder (9a, 9b, 9c, 9d) leads from the at least one docking point (8a, 8b, 8c, 8d) to an exit (16).

6. Offshore platform device according to claim 1, characterised in that the at least one docking point (8a, 8b, 8c, 8d) has one of the ladders (9a, 9b, 9c, 9d), and a guard (100a, 101a, 100b, 101b, 100c, 101c, 100d, 101d) is arranged on both sides and radially outwards adjacent to the ladder (9a, 9b, 9c, 9d).

7. Offshore platform device according to claim 1, characterised in that the docking device (4) has an interior space which is accessible and which produces an accessible connection between the at least one docking point (8a, 8b, 8c, 8d) and the exit (16).

8. Offshore platform device according to claim 1, characterised in that a plurality of exits (16) are arranged in the longitudinal direction at the upper end.

9. Offshore platform device according to claim 1, characterised in that the lifting and lowering movement of the docking device (4) is driven by means of a rack and pinion drive.

10. Method of transferring personnel to or from an offshore platform device (1), in which a platform (3) is brought into an operational position, a docking device (4) having a longitudinal axis (L), which is vertically oriented, is lowered along the longitudinal axis (L) relative to the platform (3), until a lower end of the docking device (4), which has at least one docking point (8a, 8b, 8c, 8d), touches the sea and the docking device (4) is guided through a passage (6) in the platform (3).

11. Method according to claim 10, characterised in that a penetration depth of the docking device (4) in the water is adjusted to a water level which varies with the tide.

\* \* \* \* \*